Sept. 30, 1958 G. W. BOYER 2,854,199

TAPE REELING

Filed Nov. 29, 1956

INVENTOR.
GEORGE WESLEY BOYER

BY

Christie, Parker & Hale
ATTORNEYS 2,854,199

TAPE REELING

George Wesley Boyer, Pasadena, Calif., assignor to Consolidated Electrodynamics Corporation, Pasadena, Calif., a corporation of California Application November 29, 1956, Serial No. 625,128

5 Claims. (Cl. 242—71.8)

Figures 1, 2:
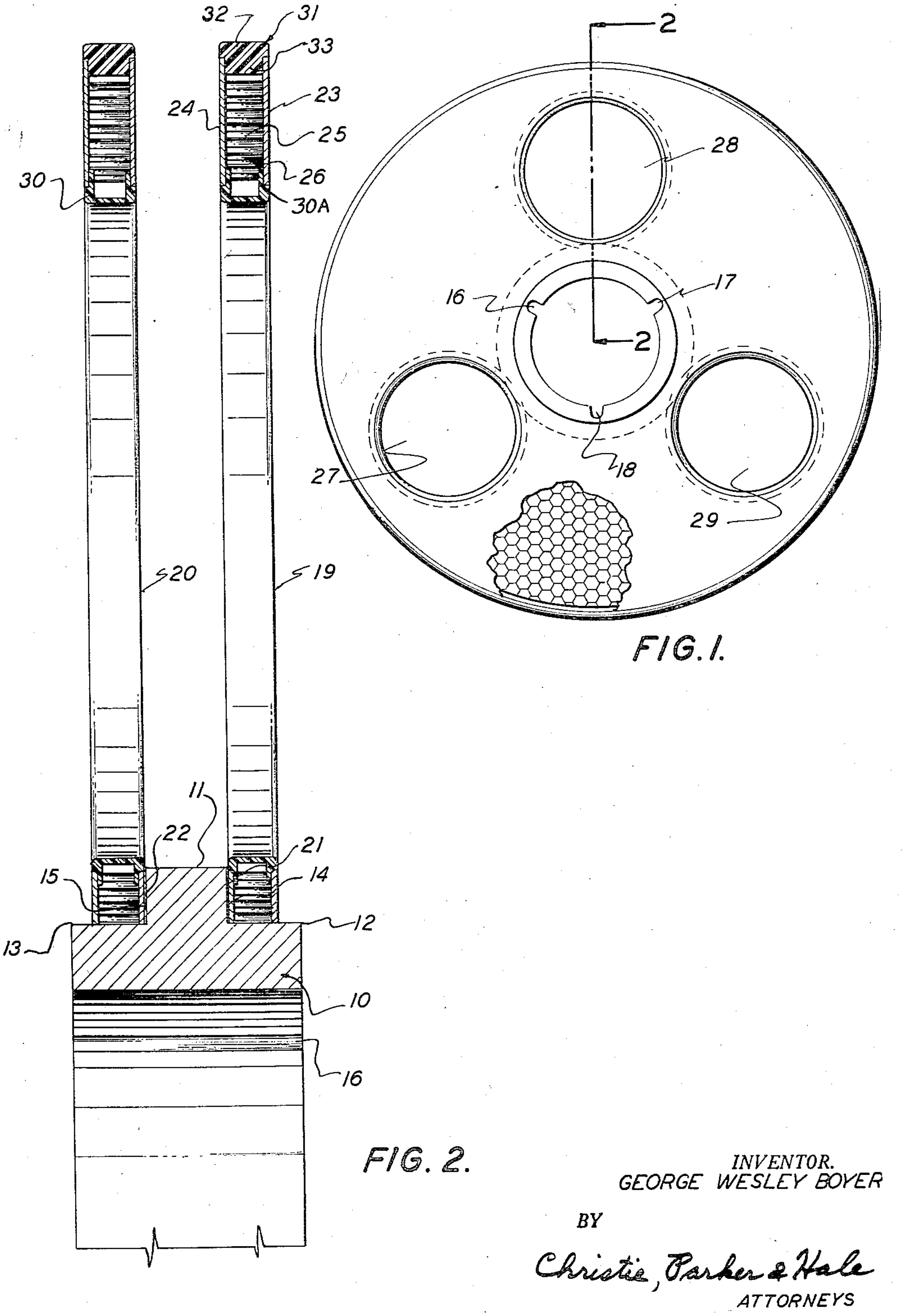

This invention is concerned with the winding of tape upon reels. More particularly, the invention relates to reels on which so-called magnetic tapes are wound and unwound at high speeds.

Magnetic tapes are elongated strips of flexible material (such as cellulose acetate, polyethylene terephthalate, or other plastic) coated on one or both faces with a composition containing finely divided magnetizable material. The tape is passed from one reel to another past a recording head, which is an electromagnet energized by a series of signals that are to be impressed on the tape. A magnetized "trace" of the successive signals is thus made on the tape, which may then be run past a "play back" head that picks up the series of signals from the tape and produces a voltage or current that varies as the original set of signals, provided that both recording and play back have been accomplished under proper conditions. If the linear tape speed varies or if the tape flutters during recording or play back, serious signal errors and distortion occur. As tape speed increases, these errors and distortions become more serious.

In several types of scientific investigations, magnetic tapes are run at unusually high speeds, say 7000 linear feet per minute and up, in order to record or play back signal trains representing variables, such as vibration rates, that should be measured accurately. These rapidly moving tapes are unwound from a tail reel and moved past a recording or play back head to be rewound as a spiral on a head reel. The reels rotate at speeds as high as 2400 R. P. M. and at such speeds tend to cause difficulties in recording and playback operations by introducing backlash and flutter in the tapes. These irregularities frequently are reflected as errors or distortions in the signal train impressed upon or picked up from the tapes. Backlash and flutter in tapes being moved at high speed from one reel to another may be reduced by decreasing the inertia or effective mass of the reels, provided that the mass reduction can be accomplished without sacrifice of rigidity in the reel structure, because lack of rigidity also tends to introduce irregularity in tape movement. However, prior attempts to reduce inertia without sacrifice of rigidity have not been notably successful.

As a result of my investigations I have developed a reel upon which magnetic tape may be wound or from which it may be unwound at very high speeds without imparting substantial errors in signals picked up from or recorded on the tape, the reel being characterized by low mass and inertia and also by extremely high rigidity. The reel of my invention has a rotatable hub with an enlarged central portion disposed between and fastened to two smaller portions. There are annular shoulders on the central portion where it joins the two smaller side portions. The reel has a pair of flanges disposed respectively over the two smaller portions of the hub and extending perpendicular to its axis. Each flange comprises a sandwich formed of two parallel plates spaced from each other by a honeycomb structure. The walls (and the cells) of the honeycomb structure extend transverse to the major surfaces of the plates from one plate to another, the honeycomb structure being, in effect, a core to which both plates are fastened. The inner plate of each flange is disposed adjacent the central portion of the hub and abutting its annular shoulder. Each of these plates is fastened to the shoulder, preferably by a thin layer of cement.

The tape to be wound or unwound is connected to the central portion of the hub between the two flanges and forms a spiral between them.

All parts of the reel should be made of material of low specific gravity. I prefer to make the hub and the flanges of aluminum or magnesium or lightweight alloys thereof.

The outside surfaces of the flanges, i. e., the outside surfaces of the two plates of each flange, should be unusually flat. By way of example, reels that are 14" in diameter should be flat within a total indicator reading of .008".

To reduce the inertia of the reels the two flanges may be cut out to provide voids extending through them from side to side. Conveniently, the rims of the cut-out portions are undercut with a router or the like to remove the honeycomb from an annulus. Circular inserts are introduced to rest between and overlap the plates and seal the annulus. Similarly, the peripheries of the flanges may be routed out and filled with a resilient band.

These and other aspects of my invention will be understood thoroughly in the light of the following detailed description. This is illustrated by the accompanying drawing, in which:

Fig. 1 is as ide view, partly in section, of a tape reel constructed in accordance with my invention; and Fig. 2 is a fragmentary cross section of the reel of Fig. 1 taken along the line 2—2.

The illustrated reel comprises a hub 10 of aluminum or other light metal. It has a coaxial central portion 11 of relatively large uniform diameter and two integrally formed coaxial side portions 12, 13 of uniform but smaller diameter. The larger central portion of the hub has annular shoulders 14, 15 which are flat and perpendicular to the axis of rotation of the hub.

The hub has three keyways 16, 17, 18 adapted to key it to a rotating shaft having corresponding keys.

The reel has two circular flanges 19, 20. They are cut out at their centers so as to fit over the smaller side portions of the hub and abut the shoulders on the central portion. The flanges are held to the hub by thin layers 21, 22 of organic cement, say epoxy cement, applied to the surface of the shoulders.

Each flange is composed of two thin aluminum alloy plates 23, 24 disposed parallel to and spaced from each other to form the outside of a sandwich the interior of which is composed of a honeycomb aluminum structure having thin aluminum walls 25 defining hexagonal cells 26 that extend transversely from one plate to the other. The cellular structure is cemented to the plates, for example with the same type of epoxy cement employed to hold the flanges to the hub.

In order to reduce the mass of the reels each flange has three circular cut out portions or voids 27, 28, 29 disposed symmetrically around the reel. The rim around each cut out portion is routed out to remove the honeycomb core in an annulus and thus afford space for filler members 30. These are extruded nylon bands that are inserted around the periphery of the cut out portion within the plates to seal this periphery. The bands fit between the plates and have an enlarged outer portion 30A which overlaps the edges of the plates. These nylon bands are simply cut to proper length and slipped into place around the circular hole. They may be cemented to the side plates, but this is not necessary because centrifugal force plus the resilience of the nylon tends to hold the bands in place.

The periphery of each flange is also routed out to remove the core and provide an annular groove between the plates. An endless band 31 of resilient synthetic rubber or the like is stretched around the periphery of each flange to seal it. The band has a large outside portion 32 which rests on the edges of the plates and an inner portion 33 which fits between the plates in the same manner as the nylon bands 30 that are employed to seal the edges of the holes in the plate. The rubber band is cemented to the plates of the flanges in order to hold it against centrifugal force when the reel is rotated.

The flanges of the reel of Figs. 1 and 2 have high rigidity even though they are made very thin. By way of example, for a reel 14" in diameter designed for rotation at speeds up to 2400 R. P. M., the total thickness of the flange need not exceed .218". The plates of each flange in such a reel are each .020" thick so that the thickness of the honeycomb core is .178". In this particular reel the cells of the honeycomb are hexagonal. Each cell is about ⅛" wide measured perpendicular to the axis of rotation of the wheel and the walls of the honeycomb are 1½ mils. thick. In fabricating the reel of Figs. 1 and 2 the flanges are made from sandwiches composed of the honeycomb core cemented between the two aluminum sheets. The cement is applied to the inside surfaces of the sheets and adheres to the ends of the cell walls. Adequate strength is imparted by the cement because, in operation, the force applied is substantially all parallel to the major surfaces of the sheets, there being little or no transverse force component. The flanges are then cut from these sandwiches and routed or undercut to accommodate the annular cells. It is important that the flange be unusually flat, the specifications requiring a flatness of .008" total indicator reading over the entire flange surface.

Although hexagonal honeycombs are preferred, they may be of any suitable shape, say triangular, square, or octagonal. In any case the walls of the honeycomb are relatively thin in comparison to the plates that form the outside of the flanges.

The cementing of the flanges to the shoulders on the sides of the central portion of the hub is an important feature of the invention. The construction is such that this cement is not subjected to excessive strain during rotation of the reel and because of the thinness of the plates and the presence of the honeycomb section mechanical fastening means such as rivets and screws are unsatisfactory as well as unnecessary.

I claim:

1. In a rotatable reel upon which tape is wound in a spiral, the combination which comprises a hub having an enlarged central coaxial portion and two adjacent coaxial smaller end portions fastened to the central portion, with annular shoulders on the sides of the central portion where this joins the smaller portions, and a pair of flanges disposed respectively over the two smaller portions of the hub and extending perpendicular to its axis of rotation, each of the flanges comprising two parallel plates spaced from each other, a honeycomb structure disposed between the plates of each flange and fastened thereto and having walls extending transverse to the major surfaces of the plates, one plate of each flange being disposed against a shoulder of the central portion of the hub and fastened thereto.

2. In a rotatable reel upon which tape is wound in a spiral, the combination which comprises a hub having an enlarged central coaxial portion and two adjacent coaxial smaller end portions fastened to the central portion, with annular shoulders on the sides of the central portion where this joins the smaller portions, and a pair of flanges disposed repectively over the two smaller portions of the hub and extending perpendicular to its axis of rotation, each of the flanges being composed of two parallel plates spaced from each other, a honeycomb structure disposed between the plates of each flange and fastened thereto and having walls extending transverse to the major surfaces of the plates, one plate of each flange being disposed adjacent one shoulder of the central portion of the hub and fastened thereto by a layer of cement.

3. In a rotatable reel upon which tape is wound in a spiral, the combination which comprises a hub having an enlarged central coaxial portion and two adjacent coaxial smaller end portions fastened to the central portion, with annular shoulders on the sides of the central portion where this joins the smaller portions, a pair of flanges disposed respectively over the two smaller portions of the hub and extending perpendicular to its axis of rotation, each of the flanges comprising two parallel plates spaced from each other, a honeycomb structure disposed between the plates of each flange and fastened thereto and having walls extending transverse to the major surfaces of the plates, one plate of each flange being disposed against a shoulder of the central portion of the hub and fastened thereto, and a resilient band disposed between the plates around the periphery of each flange.

4. In a rotatable reel upon which tape is wound in a spiral, the combination which comprises a hub having an enlarged central coaxial portion and two adjacent coaxial smaller end portions fastened to the central portion, with annular shoulders on the sides of the central portion where this joins the smaller portions, and a pair of flanges disposed respectively over the two smaller portions of the hub and extending perpendicular to its axis of rotation, each of the flanges comprising two parallel plates spaced from each other, a honeycomb structure disposed between the plates of each flange and fastened thereto and having walls extending transverse to the major surfaces of the plates, one plate of each flange being disposed against a shoulder of the central portion of the hub and fastened thereto, each flange being provided with holes that pass through it parallel to the axis of rotation, the edge of the flange defining the hole being sealed with a strip that passes around the edge between the plates of this flange.

5. In a rotatable reel upon which tape is wound in a spiral, the combination which comprises a hub having an enlarged central coaxial portion and two adjacent coaxial smaller end portions formed integrally with the central portion, with annular shoulders on the sides of the central portion where they join the smaller portions, and a pair of flanges disposed respectively over the two smaller portions of the hub and extending perpendicular to its axis of rotation, each of the flanges comprising two parallel plates spaced from each other, a honeycomb structure disposed between the plates of each flange and cemented thereto and having walls extending transverse to the major surfaces of the plates, one plate of each flange being disposed against a shoulder of the central portion of the hub and cemented thereto.

References Cited in the file of this patent

UNITED STATES PATENTS

| | | |
|---|---|---|
| 1,454,818 | Jones | May 8, 1923 |
| 2,001,569 | Kiefer | May 14, 1935 |
| 2,613,049 | Hawley | Oct. 7, 1952 |